United States Patent [19]

Welty et al.

[11] Patent Number: 5,198,957
[45] Date of Patent: Mar. 30, 1993

[54] TRANSIENT PROTECTION CIRCUIT USING COMMON DRAIN FIELD EFFECT TRANSISTORS

[75] Inventors: Dennis L. Welty, Mesa; John Bliss, Tempe; Judith L. Sutor, Chandler; Stephen P. Robb, Tempe; David M. Susak, Chandler; Lloyd H. Hayes, Mesa, all of Ariz.

[73] Assignee: Motorola, Inc., Schaumburg, Ill.

[21] Appl. No.: 547,882

[22] Filed: Jul. 2, 1990

[51] Int. Cl.⁵ .................................... H02H 9/04
[52] U.S. Cl. ............................ 361/18; 361/58; 361/91; 361/111
[58] Field of Search ................... 361/18, 58, 111, 91

[56] References Cited

U.S. PATENT DOCUMENTS

| | | | |
|---|---|---|---|
| 4,495,536 | 1/1985 | Bynum | 361/91 |
| 4,533,970 | 8/1985 | Brown | 361/58 |
| 5,027,250 | 6/1991 | Cini et al. | 361/18 |

Primary Examiner—Todd E. DeBoer
Attorney, Agent, or Firm—Robert D. Atkins

[57] ABSTRACT

A transient protection circuit provides protection from high voltage transients appearing along a transmission line by sensing a predetermined threshold of the voltage developed thereon and opening the conduction path through first and second switching circuits in the transmission line. The switching circuits are implemented with first and second serially coupled transistors sharing a common drain and enabled by a control signal during normal operation. The first and second transistors each have a diode oriented to conduct from the source to the drain for bi-directional operation. During high voltage transient conditions, a sensing circuit detect a predetermined threshold of the potential on the transmission line and disables one of the first and second transistors which opens the conduction path through the first and second switching circuits thereby suppressing the surge currents flowing therethrough.

17 Claims, 2 Drawing Sheets

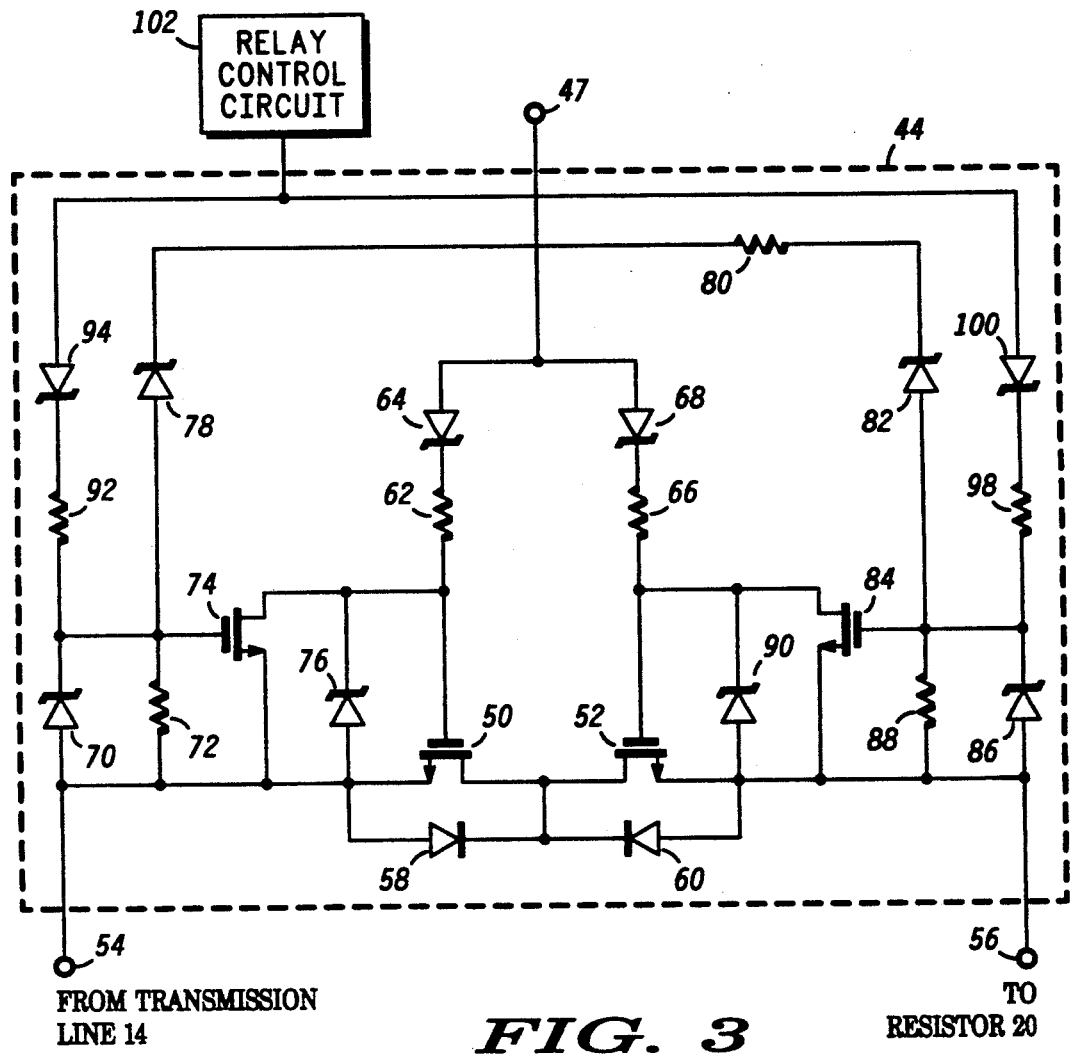
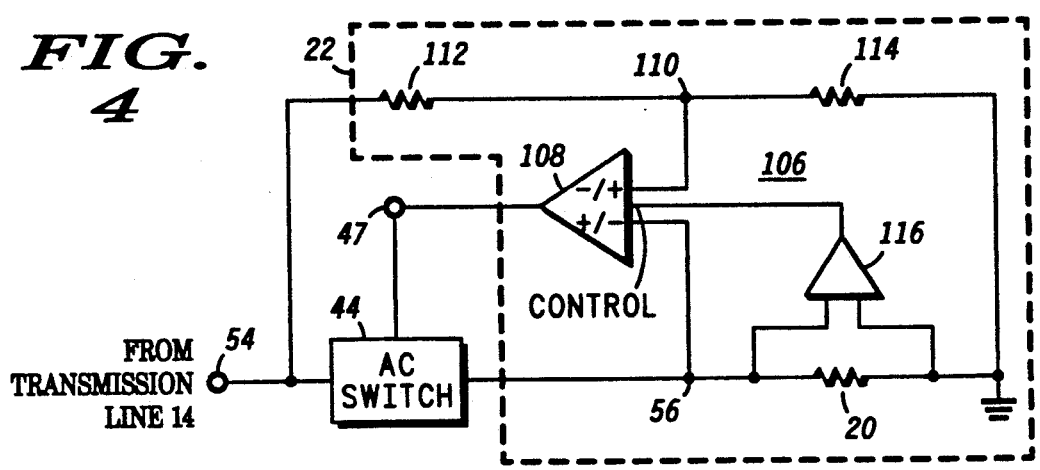

TRANSIENT PROTECTION CIRCUIT USING COMMON DRAIN FIELD EFFECT TRANSISTORS

CROSS REFERENCE TO RELATED PATENT APPLICATION

This application is related to copending U.S. Patent Application Ser. No. 07/547,738 "PRECISION FET CONTROL LOOP", filed Jul. 2, 1990, by David Susak and assigned to the same assignee, Motorola, Inc.

BACKGROUND OF THE INVENTION

This invention relates to transient protection circuits, and more particularly, to a transient protection circuit for clamping an applied voltage to a predetermined value while suppressing surge currents.

The application of transient protection circuits is well understood in electronic systems especially for those exposed to potentially adverse external conditions. In the case of telephone communication systems, for example, the electronic components throughout the system are susceptible to high voltage transients appearing along the transmission lines, possibly caused by nearby lightning strikes which may induce a high intensity electromagnetic field about the transmission line conductors, or inadvertent contact with high voltage power lines. The high voltage transients can induce surge currents which may exceed the operating rating of the electronic components within the system, causing undue stress if not permanent damage thereto.

In the telephone system example, the central telephone office and the end user, for example a residential phone site, are usually connected via a communication loop comprising two transmission lines, commonly referred to as TIP and RING, nominally energized to 48 volts DC and modulated with an AC signal for the voice data. The electronic circuitry coupled for sending and receiving the communication signals over the transmission lines are typically designed for a peak operating range of 150 volts and therefore must be protected from the high voltage transients. Accordingly, a primary voltage protection circuit is often installed at the entrance of the central telephone office for clamping the potential developed across the transmission lines to say 1000 volts. If lightning should strike nearby creating a high voltage transient on the telephone lines, the primary voltage protection circuit clamps the applied voltage to 1000 volts, while a secondary protection circuit further limits the voltage applied to the sensitive electronic components. The nature of the primary and secondary protection is more thoroughly described in the detailed description of the prior art included herein; however, in general conventional transient protection circuits are voltage clamping devices and do not inhibit the surge current induced by the electromagnetic field. Thus, it is still possible for significant currents to flow through the telephone systems during such high voltage transients in spite of the voltage clamping protection, possibly causing damage to the telephone switching equipment.

Hence, there is a need for a transient protection circuit for suppressing the surge current induced by the high voltage transient conditions in addition to providing the voltage clamping thereof.

SUMMARY OF THE INVENTION

Accordingly, an objective of the present invention is to provide an improved transient protection circuit.

Another objective of the present invention is to provide an improved transient protection circuit for clamping the applied voltage to a predetermined value.

Another objective of the present invention is to provide an improved transient protection circuit for suppressing the surge current flowing through transmission lines induced by a high voltage transient developed thereon.

Yet another objective of the present invention is to provide an improved transient protection circuit which senses a predetermined threshold of the applied potential and opens the conduction path through the transmission lines for suppressing the surge current flowing therethrough.

Still another objective of the present invention is to provide an improved transient protection circuit responsive to external automatic and operator control for opening the conduction path through the transmission lines.

Still another objective of the present invention is to provide an improved transient protection circuit on a monolithic integrated circuit.

In accordance with the above and other objectives there is provided an improved transient protection circuit comprising a switching circuit including a first transistor having a source coupled to a first terminal of the switching circuit and a gate responsive to a first control signal. The gate of a second transistor is responsive to a second control signal, while the drain is coupled to the drain of the first transistor and the source is coupled to a second terminal of the switching circuit. The first and second transistors each include a diode coupled for providing a unidirectional conduction path from the source to the drain thereof. A first circuit senses a predetermined threshold of a transient signal applied at one of the first and second terminals of the switching circuit and disables the conduction path through the first and second transistors in response thereto.

BRIEF DESCRIPTION OF THE DRAWINGS

FIG. 3 is a schematic diagram illustrating the preferred embodiment of the AC switch of the present invention; and FIG. 4 is a schematic diagram illustrating a control circuit for the AC switch.

DETAILED DESCRIPTION OF THE PRIOR ART

Figure 1:
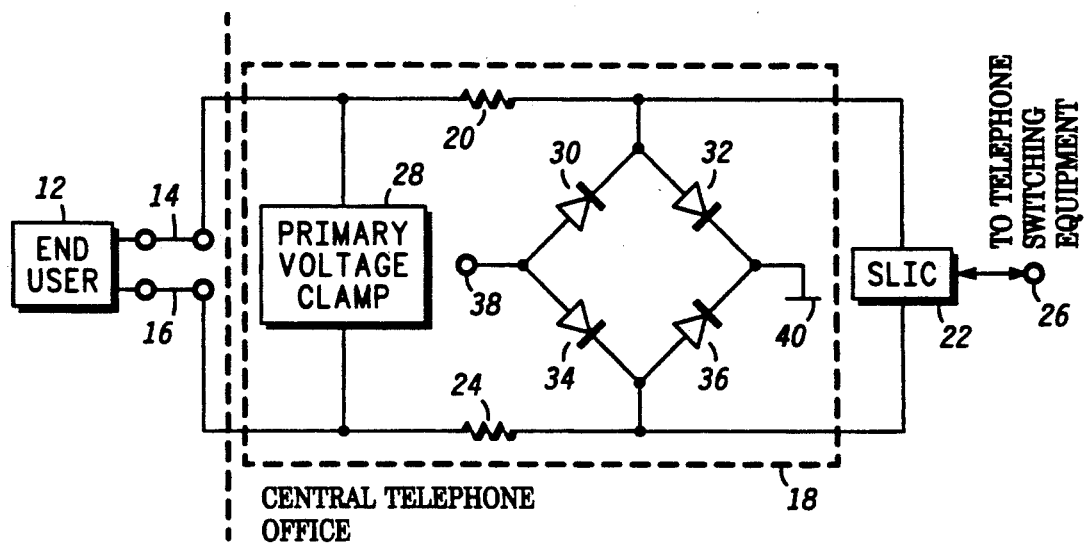
FIG. 1 is a simplified schematic and block diagram illustrating a conventional transient protection circuit.

Referring to FIG. 1, there is shown a simplified telephone communication system 10 including end user 12, such as a residential telephone, coupled through TIP and RING transmission lines 14 and 16 to the central telephone office. Transient protection circuit 18 is provided at the entrance of the central telephone office for clamping the applied voltage to a predetermined value. Transmission line 14 is coupled through resistor 20 to the first terminal of subscriber loop interface circuit (SLIC) 22, while transmission line 16 is coupled through resistor 24 to the second terminal of SLIC 22.

Resistors 20 and 24 are typically selected at 200 ohms for providing 20 milliamps of current flow through the transmission loop. The function of SLIC 22 is to exchange voice data signals with the telephone switching equipment (not shown) in the central telephone office via terminal 26, while sending and receiving telephone signals over transmission lines 14 and 16 with end user 12. For example, end user 12 may transmit telephone signals through transmission lines 14 and 16 to SLIC 22 where the voice information is extracted and passed via terminal 26 to the telephone switching equipment, which then routes the communication signals to another SLIC device in the central telephone office for transmission to the appropriate end user.

The high voltage transient protection for telephone communication system 10 is provided via transient protection circuit 18 including primary voltage clamping circuit 28 coupled between transmission lines 14 and 16 and a secondary diode bridge formed of diodes 30, 32, 34 and 36 coupled between the first and second terminals of SLIC 22. Diodes 30-36 are also coupled for receiving a reference signal, typically −48 volts DC, applied at terminal 38 and ground potential applied through power supply conductor 40. If a large positive transient appears on transmission line 14, primary voltage clamping circuit 28 limits the potential developed across transmission lines 14 and 16 to approximately 1000 volts, while the surge current flowing through resistor 20 forward biases diode 32 thereby clamping the first terminal of SLIC 22 at one diode potential above ground. If the transient signal appearing at transmission line 14 is negative, then diode 30 is forward biased, clamping the first terminal of SLIC 22 at one diode below the −48 volts DC applied at terminal 38. Likewise, a large positive potential appearing on transmission line 16 forward biases diode 36 for clamping the second terminal of SLIC 22 at one diode potential above ground, while a large negative potential at transmission line 16 forward biases diode 34 again clamping the second terminal of SLIC 22. The combination of primary voltage clamping circuit 28 and the secondary diode bridge 30-36 provides voltage clamping protection, but there is no provision in the prior art transient protection circuitry for inhibiting the surge current flowing through resistors 20 and 24 into SLIC 22. Hence, SLIC 22 is only partially protected as the surge current may cause over-stress if not permanent damage thereto. A more effective transient protection circuit is one that shuts off the surge current as well as limiting the applied voltage.

DETAILED DESCRIPTION OF THE PREFERRED EMBODIMENT

Figure 2:
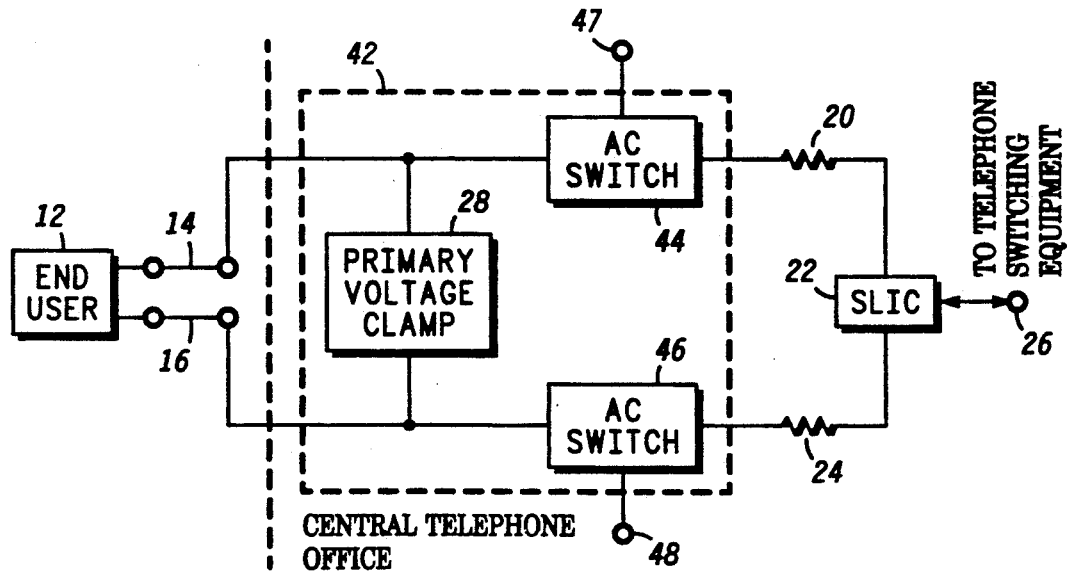
FIG. 2 is a simplified schematic and block diagram illustrating the preferred embodiment of the present invention.

Turning to FIG. 2, there is shown transient protection circuit 42 suitable for manufacturing in integrated circuit form using conventional integrated circuit processes. Components having similar functions are given the same reference numerals as used in FIG. 1. End user 12 is coupled through TIP and RING transmission lines 14 and 16 to the first and second input terminals of transient protection circuit 42, respectively, provided at the entrance of the central telephone office. Primary voltage clamping circuit 28 is coupled between transmission lines 14 and 16 and may be realized as a conventional gas discharge type clamping device. Transmission line 14 continues through AC switch 44 and resistor 20 to the first terminal of SLIC 22, while transmission line 16 is coupled through AC switch 46 and resistor 24 to the second terminal of SLIC 22. AC switches 44 and 46 are responsive to the control signals applied at terminals 47 and 48, respectively. The implementation of SLIC 22 is well known and available, for example, as Motorola Subscriber Loop Interface Circuit, Part Numbers MC3419 and MC33120.

Additional detail of AC switch 44 is shown in FIG. 3, including transistors 50 and 52 serially coupled between terminal 54 that is transmission line 14 and terminal 56. One implementation of transistors 50 and 52 is to use DMOS N-channel enhancement mode FET devices having their drains coupled together and sources coupled to terminals 54 and 56, respectively. The DMOS technology provides sufficient speed to open AC switch 44, typically in less than one microsecond, and shut off the surge current before any damage is incurred. With the common drain configuration, transient protection circuit 42 may be integrated in monolithic form thereby saving manufacturing costs and increasing reliability. Transistor 50 also includes diode 58 (inherent in the DMOS process) having an anode coupled to its source and a cathode coupled to the drain, while transistor 52 includes diode 60 having an anode coupled to its source and a cathode coupled to the drain for passing signals between the source and drain terminals thereof.

Continuing with FIG. 3, the gates of transistors 50 and 52 are coupled through resistor 62 and Zener diode 64 and through resistor 66 and Zener diode 68 to terminal 47, respectively. Zener diode 70 and resistor 72 are each coupled between the gate and source of transistor 74, the latter of which also includes a drain coupled to the gate of transistor 50, while Zener diode 76 is coupled for clamping the gate-to-source potential of transistor 50 to a predetermined value. The gate of transistor 74 is also coupled through Zener diode 78 and resistor 80 to the cathode of Zener diode 82, while the anode of the latter is coupled to the gate of transistor 84 and through each of Zener diode 86 and resistor 88 to terminal 56. The drain and source of transistor 84 is coupled to the gate and source of transistor 52, respectively. Zener diode 90 is provided between the gate and source of transistor 52 for clamping the junction potential to a predetermined value, while the gates of transistors 74 and 84 are coupled through resistor 92 and Zener diode 94 and through resistor 98 and Zener diode 100 to relay control circuit 102, respectively. Diodes 64, 68, 70, 76, 78, 82, 86, 90, 94 and 100 may be implemented as conventional Zener diodes, or as one or more pairs of back-to-back diodes, wherein the anodes and cathodes are coupled together in a serial fashion. AC switch 46 is similar in construction as described for AC switch 44.

During normal operation, AC switches 44 and 46 conduct the communication signals passing through transmission lines 14 and 16. Transistors 50 and 52 are maintained in conduction by a control signal applied at terminal 47 (and terminal 48) which forward biases Zener diodes 64 and 68 and develops a gate-source potential for transistors 50 and 52. Zener diodes 76 and 90 are provided for clamping the gate-source potentials of transistors 50 and 52 in the on-state at say ten volts. When the potential developed at terminal 56 is high with respect to terminal 54, diode 60 is forward biased and the communication signal flows from terminal 56 through diode 60 and transistor 50, out terminal 54 and along transmission line 14. Alternately, when the potential developed at terminal 54 is more positive than that t of terminal 56, diode 58 is forward biased and the communication signal flows through diode 58 and transistor 52 and out terminal 56. Thus, the combination of transistors 50 and 52 with diodes 58 and 60 allows bidirectional operation of AC switch 44.

Now consider a positive high voltage transient occurring along transmission line 14 and appearing at terminal 54. Primary voltage clamping circuit 28 is activated clamping the applied potential to 1000 volts. As the potential applied at terminal 54 exceeds the predetermined turn-on threshold of Zener diode 82 of say 150 volts, a conduction path is established through resistor 72 in parallel with Zener diode 70, Zener diode 78, resistor 80, Zener diode 82, and resistor 88 in parallel with Zener diode 86. Zener diodes 70 and 78 operates as conventional diodes for a positive high voltage transient at terminal 54, while resistors 72 and 88 are selected with large values, say one megaohm, for limiting the current flowing therethrough. A typical value for resistor 80 is 100K ohms. The potential developed across resistor 88 turns on transistor 84, effectively shorting the gate and source terminals of transistor 52 and rendering the drain-source conduction path thereof high impedance. Although diode 58 may still conduct, transistor 52 is non-conductive thereby suppressing the surge current induced by the high voltage transient, while the control signal provided via terminal 47 is diverted through transistor 84. Zener diodes 70 and 86 are provided for clamping the gate-source junction potential of transistors 74 and 84 in the on-state at approximately eight volts. Notably, the 1000 volt clamp is still impressed across transistors 50 and 52, hence, each must be sized to withstand such a potential. Therefore, the turn-on threshold of Zener diodes 78 and 82 provides unidirectional isolation from the normal operating analog signals propagating through transmission line 14 which allows for example a telephone ring signal of 90 Vrms to pass without tripping transient protection circuit 42. When the predetermined threshold is reached, 150 volts in the present example, the isolation feature is overcome and Zener diodes 78 and 82 conduct. It is understood that other circuits may provide similar isolation properties.

For the case of a negative high voltage transient appearing at terminal 54, as the 150 volt threshold of Zener diode 78 is reached, the conduction path through resistors 88, 80 and 72 and Zener diodes 86, 82, 78 and 70 is enabled which develops a voltage across resistor 72 turning on transistor 74. The gate-source junction potential of transistor 50 is thus reduced near zero by transistor 74, turning off transistor 50 and again opening the conduction path through transistors 50 and 52 and inhibiting the flow of any surge currents. Hence, AC switch 44 provides a conduction path for the communication signals during normal operation and upon sensing a positive or negative high voltage transients greater than the predetermined threshold of Zener diodes 78 and 82, disables transistor 50 or transistor 52 thereby opening the conduction path and suppressing the surge current associated with the high voltage condition. Since it is the relative potential across AC switch 44 that triggers the disabling sequence, AC switch 44 operates in a similar manner for high voltage transients appearing at terminal 56. Moreover, AC switch 46 is constructed in a similar manner and operates as described for AC switch 44 only on transmission line 16. Thus, the first and second terminals of SLIC 22 are protected from surge currents as AC switches 44 and 46 sense the occurrence of a high voltage transient of predetermined magnitude and open the respective conduction paths through transmission lines 14 and 16.

It is important to note that the drain-source resistances ($R_{DSON}$) of transistors 50 and 52 are made large, say 150 ohms, for lower manufacturing costs. The $R_{DSON}$ of transistors 50 and 52 in combination with resistors 20 and 24 (each now 50 ohms) provides a similar impedance as seen in FIG. 1 where resistor 20 and 24 are each 200 ohms thus providing compatibility with existing telephone system impedances. However with the larger values of $R_{DSON}$ for transistors 50 and 52, it is necessary to control the gate potentials thereof in order to maintain the impedance matching (200 ohms) through TIP and RING transmission lines 14 and 16. Turning to FIG. 4, control circuit 106 is shown incorporated into SLIC 22 and comprising bi-phase operational amplifier (op amp) 108 having a first input that is node 110 coupled through resistor 112 to terminal 54 of AC switch 44 and through resistor 114 to a terminal operating at ground potential. The second input of op amp 108 is coupled to terminal 56, while the output thereof is coupled to terminal 47 of AC switch 44. In addition, comparator circuit 116 is shown having first and second inputs coupled across resistor 20 and an output coupled to a phase control input of op amp 108. Components having similar functions are given the same reference numerals as used in FIG. 2. Control circuit 106 is duplicated for AC switch 46 wherein the output of the bi-phase operational amplifier is coupled to terminal 48.

As stated, the sum of resistor 20 and the $R_{DSON}$ of transistors 50 and 52 is substantially equal to a predetermined resistance of 200 ohms. The sum of resistors 112 and 114 are selected much greater than that of resistor 20 so that the former do not influence the $R_{DSON}$ of transistors 50 and 52 plus resistor 20. Operational amplifier 108 operates to maintain the voltages at its first and second inputs substantially equal, as is understood. The voltages at nodes 110 and 56 can be calculated as:

$$V_{110} = V_{54} \times [R_{114}/(R_{112}+R_{114})] \quad (1)$$

$$V_{56} = V_{54} \times [R_{20}/(R_{20}+R_{44})] \quad (2)$$

where:
$V_{110}$ is the voltage at the first input of op amp 108
$V_{56}$ is the voltage at the second input of op amp 108
$V_{54}$ is the voltage at terminal 54
$R_{44}$ is the resistance through AC switch 44 (transistors 50 and 52)
$R_{20}$, $R_{112}$ and $R_{114}$ are the values of resistors 20, 112 and 114, respectively Since AC switch 44 is in the negative feedback loop of op amp 108, terminal 47 is driven by the output signal of op amp 108 until the voltage at the second input of op amp 108 is substantially equal to the voltage at the first input ($V_{110}=V_{56}$), whereby Equations (1) and (2) may be combined and reduced to:

$$R_{112}/R_{114} = R_{44}/R_{20} \quad (3)$$

Thus, from Equation (3), the precision of the ratio of the $R_{DSON}$ of transistors 50 and 52 ($R_{44}$) to resistor 20 is clearly determined by the precision of the ratio of resistor 112 to resistor 114 and since resistors 112 and 114 are typically higher value, lower current resistors, the $R_{DSON}$ of transistors 50 and 52 may be closely controlled. Moreover, resistors 20, 112 and 114 may be readily fabricated on an integrated circuit for providing even higher precision of the ratios.

As previously disclosed, AC switch 44 is bi-directional and therefore op amp 108 must properly control the gate voltage of transistors 50 and 52 for both increasing and decreasing potentials between terminals 54 and 56. Accordingly, comparator circuit 116 is provided for monitoring the direction of current through resistor 20 and controlling the phase of bi-phase op amp 108 by switching the non-inverting and inverting inputs at the first (node 110) and second (node 56) inputs thereof. If the voltage at terminal 54 is increasing, the output signal of comparator circuit 116 applied at the control input of op amp 116 switches the non-inverting input to the first input and the inverting input to the second input thereof, whereby the voltage at the output of op amp 116 increases which decreases the $R_{DSON}$ of transistors 50 and 52 and increases the voltage at the second input of op amp 108. Alternately, if the voltage at terminal 54 is decreasing, the output signal of comparator circuit 116 switches the inverting input to the first input and the non-inverting input to the second input thereof whereby the voltage at the output of op amp 116 decreases, increasing the $R_{DSON}$ of transistors 50 and 52 and decreasing the voltage at the second input of op amp 116. Additional information regarding control circuit 106 is disclosed in U.S. application Ser. No. 07/547,738 PRECISION FET CONTROL LOOP, referenced in Cross Reference to Related Patent Application and is hereby incorporated by reference made thereto.

Another feature of the present invention is provided via relay control circuit 102 wherein a disable signal is applied through resistor 92 and Zener diode 94 and through resistor 98 and Zener diode 100 for developing a potential across resistors 72 and 88, turning on transistors 74 and 84 and turning off transistors 50 and 52, respectively. Zener diodes 94 and 100 also provide an isolation of 150 volts between the high voltage transients and relay control circuitry 102. Relay control circuit 102 may operate under automatic or operator control as a relay control option for opening the conduction path between end user 12 and SLIC 22 thereby blocking the telephone communication signals which allows various test signals to be applied, for example, for performing diagnostic testing on an external phone line.

Hence, what has been described is a novel transient protection circuit including first and second serially coupled transistors operating as a switching circuit and sharing a common-drain, wherein a sensing circuit detects a predetermined threshold of the applied potential and disables the first or second transistor thereby opening the conduction path for suppressing the surge currents flowing through the switching circuit. The telephone communication application described herein is given as an example of the useful nature of the transient protection circuit and is not intended to limit the scope of the invention. The present invention is equally beneficial in other circuit applications wherein there is a need to suppress potentially harmful transients.

We claim:

1. A transient protection circuit including a switching circuit having first and second terminals, wherein the switching circuit comprises:

a first transistor having a gate, a drain and a source, said source being coupled to the first terminal of the switching circuit, said gate being responsive to a first control signal, said first transistor including a first diode coupled for providing a unidirectional conduction path from said source to said drain thereof;

a second transistor having a gate, a drain and a source, said drain being coupled to said drain of said first transistor, said gate being responsive to a second control signal, said source being coupled to the second terminal of the switching circuit, said second transistor including a second diode coupled for providing a unidirectional conduction path from said source to said drain thereof; and first means for sensing a predetermined threshold of a transient signal applied at one of the first and second terminals of the switching circuit and disabling the conduction path through said first and second transistors in response thereto.

2. A transient protection circuit including a switching circuit having first and second terminals, wherein the switching circuit comprises:

a first transistor having a gate, a drain and a source, said source being coupled to the first terminal of the switching circuit, said gate being responsive to a first control signal, said first transistor including a first diode coupled for providing a unidirectional conduction path from said source to said drain thereof;

a second transistor having a gate, a drain and a source, said drain being coupled to said drain of said first transistor, said gate being responsive to a second control signal, said source being coupled to the second terminal of the switching circuit, said second transistor including a second diode coupled for providing a unidirectional conduction path from said source to said drain thereof; and first means for sensing a predetermined threshold of a transient signal applied at one of the first and second terminals of the switching circuit and disabling the conduction path through said first and second transistors in response thereto, said first means including, (a) a third transistor having a gate, a drain and a source, said drain being coupled to said gate of said first transistor, said source being coupled to said source of said first transistor, (b) a first resistor coupled between said gate and source of said third transistor, (c) second means having a first terminal coupled to said gate of said third transistor and having a second terminal for providing a unidirectional isolation up to a predetermined threshold and conducting thereafter, (d) a fourth transistor having a gate, a drain and a source, said drain being coupled to said gate of said second transistor, said source being coupled to said source of said second transistor, (e) a second resistor coupled between said gate and source of said fourth transistor, and (f) third means having a first terminal coupled to said gate of said fourth transistor and having a second terminal coupled to said second terminal of said second means for providing a unidirectional isolation up to a predetermined threshold and conducting thereafter, said unidirectional isolation of said third means opposing said unidirectional isolation of said second means.

3. The transient protection circuit of claim 2 wherein said first means further includes a third resistor coupled between said second terminals of said second and third means.

4. The transient protection circuit of claim 3 wherein said second means includes a first zener diode having an anode coupled to said first terminal of said second means and having a cathode coupled to said second terminal of said second means.

5. The transient protection circuit of claim 4 wherein said third means includes a second zener diode having an anode coupled to said first terminal of said third means and having a cathode coupled to said second terminal of said third means.

6. The transient protection circuit of claim 5 wherein said first means further includes:
   a third zener diode having an anode coupled to said source of said third transistor and having a cathode coupled to said gate of said third transistor;
   a fourth zener diode having an anode coupled to said source of said first transistor and having a cathode coupled to said gate of said first transistor;
   a fifth zener diode having an anode coupled to said source of said fourth transistor and having a cathode coupled to said gate of said fourth transistor; and
   a sixth zener diode having an anode coupled to said source of said second transistor and having a cathode coupled to said gate of said second transistor.

7. The transient protection circuit of claim 1 further includes:
   second means having an output for providing a disable signal; and
   third means responsive to said disable signal for disabling said first transistor.

8. The transient protection circuit of claim 7 wherein said first means includes:
   a third transistor having a gate, a drain and a source, said drain being coupled to said gate of said first transistor, said source being coupled to said source of said first transistor;
   a first resistor coupled between said gate and source of said third transistor;
   fourth means having a first terminal coupled to said gate of said third transistor and having a second terminal for providing a unidirectional isolation up to a predetermined threshold and conducting thereafter;
   a fourth transistor having a gate, a drain and a source, said drain being coupled to said gate of said second transistor, said source being coupled to said source of said second transistor;
   a second resistor coupled between said gate and source of said fourth transistor; and
   fifth means having a first terminal coupled to said gate of said fourth transistor and having a second terminal coupled to said second terminal of said fourth means for providing a unidirectional isolation up to a predetermined threshold and conducting thereafter, said unidirectional isolation of said fourth means opposing said unidirectional isolation of said fifth means.

9. The transient protection circuit of claim 8 wherein said fifth means includes:
   a fourth resistor coupled between said output of said fourth means and said gate of said third transistor; and
   a fifth resistor coupled between said output of said fourth means and said gate of said fourth transistor.

10. An integrated transient protection circuit including a switching circuit having first and second terminals, wherein the switching circuit comprises:
    a first transistor having a gate, a drain and a source, said source being coupled to the first terminal of the switching circuit, said gate being responsive to a first control signal, said first transistor including a first diode coupled for providing a unidirectional conduction path from said source to said drain thereof;
    a second transistor having a gate, a drain and a source, said drain being coupled to said drain of said first transistor, said gate being responsive to a second control signal, said source being coupled to the second terminal of the switching circuit, said second transistor including a second diode coupled for providing a unidirectional conduction path from said source to said drain thereof;
    a third transistor having a gate, a drain and a source, said drain being coupled to said gate of said first transistor, said source being coupled to said source of said first transistor;
    a first resistor coupled between said gate and source of said third transistor;
    first means having a first terminal coupled to said gate of said third transistor and having a second terminal for providing a unidirectional isolation up to a predetermined threshold and conducting thereafter;
    a fourth transistor having a gate, a drain and a source, said drain being coupled to said gate of said second transistor, said source being coupled to said source of said second transistor;
    a second resistor coupled between said gate and source of said fourth transistor; and
    second means having a first terminal coupled to said gate of said fourth transistor and having a second terminal coupled to said second terminal of said first means for providing a unidirectional isolation up to a predetermined threshold and conducting thereafter, said unidirectional isolation of said second means opposing said unidirectional isolation of said first means.

11. The transient protection circuit of claim 10 further includes a third resistor coupled between said second terminals of said second and third means.

12. The transient protection circuit of claim 11 wherein said first means includes a first zener diode having an anode coupled to said first terminal of said first means and having a cathode coupled to said second terminal of said first means.

13. The transient protection circuit of claim 12 wherein said second means includes a second zener diode having an anode coupled to said first terminal of said second means and having a cathode coupled to said second terminal of said second means.

14. The transient protection circuit of claim 13 wherein said first means further comprises:
    a third zener diode having an anode coupled to said source of said third transistor and having a cathode coupled to said gate of said third transistor;
    a fourth zener diode having an anode coupled to said source of said first transistor and having a cathode coupled to said gate of said first transistor;
    a fifth zener diode having an anode coupled to said source of said fourth transistor and having a cathode coupled to said gate of said fourth transistor; and a sixth zener diode having an anode coupled to said source of said second transistor and having a cathode coupled to said gate of said second transistor.

15. The transient protection circuit of claim 14 wherein said first means further includes:

third means having an output for providing a disable signal;

fourth means coupled between said output of said third means and said gate of said third transistor for disabling said first transistor; and fifth means coupled between said output of said third means and said gate of said fourth transistor for disabling said second transistor.

16. The transient protection circuit of claim 15 wherein said fourth means includes a fourth resistor coupled between said output of said third means and said gate of said third transistor.

17. The transient protection circuit of claim 16 wherein said fifth means includes a fifth resistor coupled between said output of said third means and said gate of said fourth transistor.

* * * * *